(12) United States Patent
Hack et al.

(10) Patent No.: US 10,543,619 B2
(45) Date of Patent: Jan. 28, 2020

(54) METHOD OF FABRICATING A 3-DIMENSIONAL STRUCTURE, MESH FORMWORK ELEMENT FOR FABRICATING A 3-DIMENSIONAL STRUCTURE AND METHOD OF FABRICATING THE SAME

(71) Applicants: ETH SINGAPORE SEC LTD, Singapore (SG); ETH ZURICH (SWISS FEDERAL INSTITUTE OF TECHNOLOGY ZURICH), Zurich (CH); SIKA TECHNOLOGY AG, Baar (CH)

(72) Inventors: Norman Peter Hack, Zurich (CH); Willi Viktor Lauer, Munich (DE); Fabio Matteo Gramazio, Zurich (CH); Matthias Kohler, Zurich (CH); Norman Blank, Baar (CH)

(73) Assignees: ETH SINGAPORE SEC LTD., Singapore (SG); ETH ZURICH (SWISS FEDERAL INSTITUTE OF TECHNOLOGY ZURICH), Zurich (CH); SIKA TECHNOLOGY AG, Baar (CH)

( * ) Notice: Subject to any disclaimer, the term of this patent is extended or adjusted under 35 U.S.C. 154(b) by 518 days.

(21) Appl. No.: 14/916,475

(22) PCT Filed: Sep. 4, 2014

(86) PCT No.: PCT/SG2014/000419
§ 371 (c)(1),
(2) Date: Mar. 3, 2016

(87) PCT Pub. No.: WO2015/034438
PCT Pub. Date: Mar. 12, 2015

(65) Prior Publication Data
US 2016/0207220 A1 Jul. 21, 2016

Related U.S. Application Data

(60) Provisional application No. 61/873,467, filed on Sep. 4, 2013.

(51) Int. Cl.
*B29C 70/26* (2006.01)
*B28B 23/00* (2006.01)
*B28B 23/02* (2006.01)

(52) U.S. Cl.
CPC ........ *B28B 23/005* (2013.01); *B28B 23/0006* (2013.01); *B28B 23/02* (2013.01); *B29C 70/26* (2013.01)

(58) Field of Classification Search
None
See application file for complete search history.

(56) References Cited

U.S. PATENT DOCUMENTS 3,396,545 A 8/1968 Lamberton
3,462,521 A * 8/1969 Bini ................. E04B 1/169
264/32

(Continued)

FOREIGN PATENT DOCUMENTS

DE 2004006662 12/2004
EP 1321602 6/2003

(Continued)

OTHER PUBLICATIONS

Mar. 19, 2018 Office Action issued in European Application No. 14 842 848.5.

(Continued)

*Primary Examiner* — Edmund H Lee
(74) *Attorney, Agent, or Firm* — Oliff PLC

(57) ABSTRACT

Method of fabricating a 3-dimensional structure, mesh formwork element for fabricating a 3-dimensional structure, and method of fabricating the same. The method of fabricating a 3-dimensional structure comprises providing a mesh formwork element such that a cavity bound by at least two opposing portions of the mesh formwork is formed; accumulating a material in the cavity; and allowing the material to harden; wherein apertures in the at least two opposing portions of the mesh formwork element are adapted to the hydro-static pressure of the accumulated material or vice versa such that at least two surfaces of the hardened material substantially take on the respective shapes defined by the two opposing portions of the mesh formwork element.

24 Claims, 16 Drawing Sheets

(56) References Cited

U.S. PATENT DOCUMENTS

| 3,780,975 | A | 12/1973 | Turzillo |
| 5,857,293 | A | 1/1999 | Redjvani |
| 2013/0014458 | A1 | 1/2013 | Boydstun, IV et al. |

FOREIGN PATENT DOCUMENTS

| WO | 03/029573 | 4/2003 |
| WO | 03/040487 | 5/2003 |
| WO | 2015065936 | 5/2015 |

OTHER PUBLICATIONS

PCT/SG2014/000419 International Search Report and Written Opinion dated Oct. 28, 2014 (8 pages).
Extended European Search Report for Application No. 14842848.5 dated Apr. 18, 2017 (9 pages).
Hack et al: "Mesh Mould: Differentiation for Enhanced Performance", Rethinking Comprehensive Design: Speculative Counterculture, Proceedings of the 19th International Conference of the Association of Computer-Aided Architectural Design Research in Asia Caadria 2014, May 2014, 1-10.
Anonymous: "Rethinking Comprehensive Design: Speculative Counterculture, Proceedings of the 19th International Conference on Computer-Aided Architectural Design Research in Asia : Cumulative Index of Computer Aided Architectural Design", May 2014, retrieved from the Internet: URL:https://cumincad.architexturez.net/doc /oai-cumincadworks-id-caadria2014-000 [retrieved on Apr. 5, 2017].
Hack et al: "Mesh-Mould: Robotically Fabricated Spatial Meshes as Reinforced Concrete Formwork", Archit Design, Apr. 16, 2014, pp. 44-53, Retrieved from the Internet: URL:http://onlinelibrary.wiley.com/doi/10. 1002/ad.1753/full [retrieved on Apr. 4, 2017].
Hack et al: "Overcoming Repetition: Robotic fabrication processes at a large scale", International Journal of Architectural Computing, vol. 11, No. 3, Sep. 1, 2013, pp. 286-299.
Oct. 17, 2018 Office Action issued in European Patent Application No. 14 842 848.5.

\* cited by examiner

METHOD OF FABRICATING A 3-DIMENSIONAL STRUCTURE, MESH FORMWORK ELEMENT FOR FABRICATING A 3-DIMENSIONAL STRUCTURE AND METHOD OF FABRICATING THE SAME

FIELD OF INVENTION

This application relates broadly to a method of fabricating a 3-dimensional structure, a mesh formwork element for fabricating a 3-dimensional structure, and a method of fabricating the same.

BACKGROUND

DE20 2004 006 662 U1 shows a three-dimensional moulded wire fabric comprising loops with different sizes knitted together by at least the two previous loops. Individual wires are mechanically fixed together on the crossing points or contact points on pre-determined sites.

WO 2003029573 A1 discloses a hollow formwork for a reinforcing concrete structure, such as a concrete floor. The formwork comprises a hollow tube having a circular, square, trapezoid, or other shape. A transversely stiffening rib is fixed to the inside of the hollow tube in a direction perpendicular to the axis thereof. A reinforcing bar, which is formed on the two sides of the transversely stiffening rib, may be extended beyond the hollow tube. The reinforcing bar is extended outside the tube to form an reinforcing bar.

EP 1321602 A1 discloses a formwork apparatus for forming a concrete structure. The formwork apparatus comprises at least one formwork shuttering-panel and a forming element, such as a boot movably mounted relative to the shuttering panel. A forming element is supported by an arm, which in turn is supported by a clamp that is removably attached to upper edge of the shuttering panel.

At least preferred embodiments of the present invention seek to provide an improved method of fabricating a 3-dimensional structure, mesh formwork element for fabricating a 3-dimensional structure, and method of fabricating the same.

SUMMARY

In accordance with a first aspect of the present invention there is provided a method of fabricating a 3-dimensional structure, the method comprising providing a mesh formwork element such that a cavity bound by at least two opposing portions of the mesh formwork is formed; accumulating a material in the cavity; and allowing the material to harden; wherein apertures in the at least two opposing portions of the mesh formwork element are adapted to the hydro-static pressure of the accumulated material or vice versa such that at least two surfaces of the hardened material substantially take on the respective shapes defined by the two opposing portions of the mesh formwork element.

In accordance with a second aspect of the present invention there is provided a mesh formwork element for fabricating a 3-dimensional structure, comprising a cavity bound by at least two opposing portions of the mesh formwork element; wherein apertures in the at least two opposing portions of the mesh formwork element are adapted to the hydro-static pressure of a material intended to be accumulated in the cavity for formation of the 3-dimensional structure, such that at least two surfaces of the hardened material substantially take on the respective shapes defined by the two opposing portions of the mesh formwork element.

In accordance with a third aspect of the present invention there is provided a mesh formwork structure comprising a plurality of mesh formwork elements as defined in the second aspect.

In accordance with a fourth aspect of the present invention there is provided a 3-dimensional structure comprising one or more formwork elements as defined in the second aspect.

In accordance with a fifth aspect of the present invention there is provided a method of fabricating a formwork element for fabricating a 3-dimensional structure, the method comprising bounding a cavity by at least two opposing portions of the mesh formwork element; and adapting apertures in the at least two opposing portions of the mesh formwork element to the hydro-static pressure of a material intended to be accumulated in the cavity for formation of the 3-dimensional structure, such that at least two surfaces of the hardened material substantially take on the respective shapes defined by the two opposing portions of the mesh formwork element.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

In the following descriptions, details are provided to further explain embodiments of possible applications. It shall be apparent to one skilled in the art, however, that the embodiments may be practiced without such details.

Some parts of the embodiments, which are shown in the Figs., have similar parts. The similar parts have the same names or similar part numbers with a prime symbol or with an alphabetic symbol. The description of such similar parts also applies by reference to other similar parts, where appropriate, thereby reducing repetition of text without limiting the disclosure.

Figure 1:
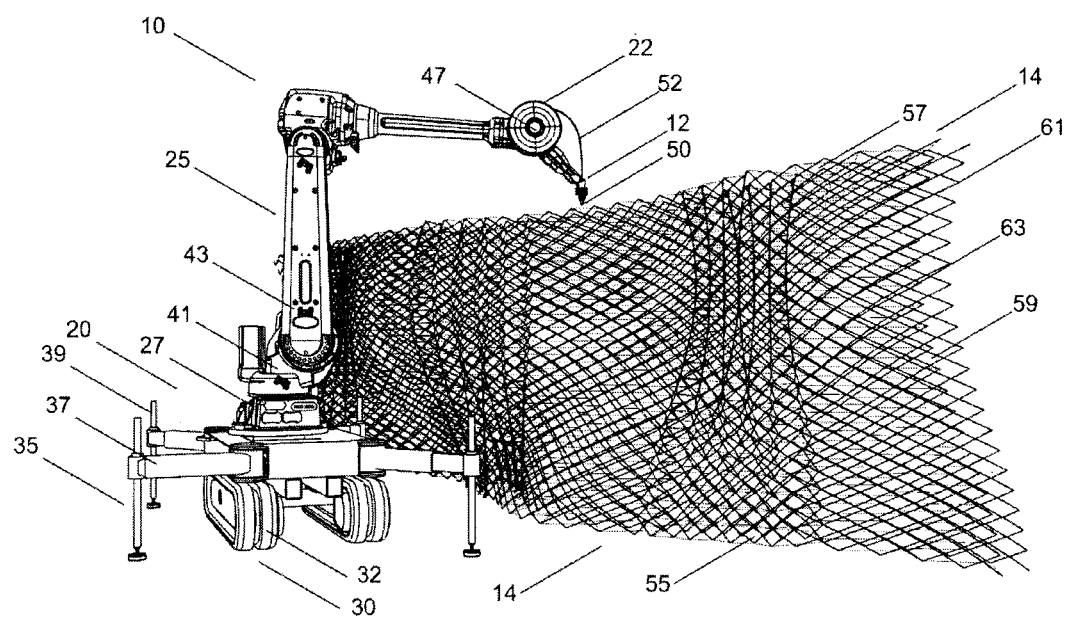
FIG. 1 illustrates a perspective view of a movable robot and a fabricated mesh formwork.

FIG. 1 shows a movable robot 10 and an extruded mesh formwork 14 that is extruded by the robot 10.

The mesh formwork 14 has a cavity 59 bound by two opposing portions 61, 63 of the mesh formwork 14. In the mesh formwork 14, the side portions 65, 67 of the mesh formwork 14 also bound the cavity 59. It is noted that in different embodiments, aperture-less elements, such as panels or sheets may be provided at the sides of a mesh formwork made up by the two opposing portions 61, 63.

The apertures e.g. 55, 57 of the mesh formwork 14 are adapted to the hydro-static pressure of a material which is accumulated in the cavity to fabricate a 3-dimensional structure. Alternative, the hydro-static pressure of a material which is accumulated in the cavity to fabricate a 3-dimensional structure is adapted apertures e.g. 55, 57 of the mesh formwork 14.

After hardening, surfaces of the hardened material substantially take on the respective shapes defined by the portions of the mesh formwork element, thus a 3-dimensional structure can be fabricated that substantially takes its shape from the shape of the mesh formwork.

Advantageously, the material, such as a fresh cementitious mixture, protrudes through the apertures during hardening so as to embed the mesh formwork 14 such that the mesh formwork 14 re-enforces the fabricated structure, e.g. a concrete structure.

The robot 10 can produce different mesh formworks 14 with various shapes made from a filament/wire or filaments/wires. The robot 10 is controlled by a program, which provides different instructions for producing different mesh formworks 14. These fabricated mesh formworks 14 can have one or more curved surfaces and one or more flat surfaces. In other words, the shape of the mesh formwork 14 can be complex. This is unlike other formwork techniques where the formwork has mainly planar surfaces which limits the shapes of the structures that can be constructed.

The movable robot 10 has an adjustable and mobile base or main body 20, with a material container 22 as well as an arm unit 25 with an end-effector 12.

In particular, the arm unit 25 is attached to an upper surface of the main body 20. The end-effector 12 is attached to a distal end of the arm unit 25. The material container 22 is placed above the main body 20. In other words, the extruding container 22 is located in the vicinity of the main body 20.

The main body 20 includes a pair of moving means 30. Each movement means 30 includes a continuous Caterpillar track 32. The moving means 30 are attached to a lower surface of the main body 20. As seen in FIG. 1 the continuous tracks 32 extend from one end to another end of the main body 20. The main body 20 has track-driving pulleys, which engages with the continuous tracks 32. The track-driving pulleys are not shown in the FIG. 1.

The main body 20 also includes an outrigger unit 35 that is attached to sides of the main body 20. The outrigger unit 35 comprises horizontal beams 37 and vertical poles 39 that attached to outer ends of the horizontal beams 37 as well as a hydraulic means that is attached to horizontal beams 37 and the vertical poles 39. The hydraulic means is not shown in the FIG. 1.

The arm unit 25 includes a first link 41 and a second link 43. As seen in FIG. 1, the first link 41 has a first end and a second end. The first end is attached to an arm rotatable means 27 by a rotatable body joint 45, wherein the arm rotatable means 27 is attached to an upper surface of the main body 20. The first link 41 is attached to a first link driving mechanism that is not shown in FIG. 1.

Similarly, the second link 43 has a first end and a second end. The first end is attached to the second end of the first link 41 by a rotatable link joint 47 while the second end is attached to the end-effector 12. The second link 43 is also attached to a second link driving mechanism that is not shown in the FIG. 1.

The end-effector 12 includes a controller, a camera unit, and an extruding nozzle 50. The controller and the camera unit are not shown in the Figs.

The material container 22 is located in the vicinity of the main body 20. Pipes 52 connect the material container 22 to the end-effector 12.

In a generic sense, wheels or a rolling platform can replace the tracks 32.

The track-driving pulleys turn the Caterpillar tracks 32 for moving the main body 20 to desired positions.

The outrigger unit 35 keeps the main body 20 stable, especially when the arm unit 25 is in motion. In detail, the hydraulic means moves the horizontal beams 37 and the vertical poles 39 such that the main body 20 and the moving means 30 are lifted off the ground to keep the main body 20 from shifting and swinging.

The arm rotatable means 25 rotates about a vertical axis for revolving the arm unit 25.

The first link driving mechanism positions the first link 41 at different angles with respect to the main body 20. Likewise, the second link driving mechanism positions the second link 43 at different angles with respect to the first link 41.

The material container 22 holds a material for transferring to the end-effector 12.

The location of the material container 22 provides an advantage in that this allows the end-effector 12 to receive material from the said container 22 while not bearing the weight of the said container 22. Because of this, the end-effector 12 is lighter and is easier to position.

The pipes 52 provide a passageway for channelling extruding material from the material container 22 to the end-effector 12. Referring to the end-effector 12, the camera unit receives images around the end-effector 12 and sends these images to the controller, wherein the controller checks tolerances of the produced mesh to position accurately the extruding nozzle 50.

In a general sense, a sensor, such as an optical sensor, a surface tension sensor, a temperature sensor, or a sonic sensor, can replace the camera unit.

The nozzle 50 receives the material from the material container 22. The extruding nozzle 50 then expels these materials to form elongated filament sections for fabricating the mesh formwork 14.

Figure 22:
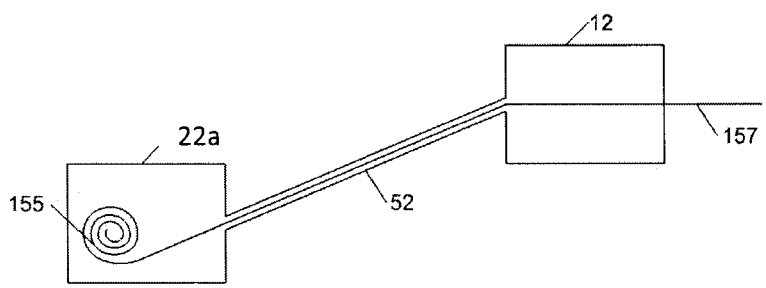
FIG. 22 illustrates one implementation of the material container of the robot of FIG. 1.

One implementation of the material container 22 is shown in FIG. 22. FIG. 22 shows a material container 22a that holds a reel of elongated Kevlar, basalt, glass fibre or such wire 155 that is coated with plastic material. The pipe 52 provides a passageway for transferring the plastic coated wire 155 to the end-effector 12. The end-effector 12 then heats the plastic coated wire 155 such that its plastic coating is mouldable. The end-effector 12 then expels the heated plastic coated wire 155 to form an elongated filament 157. The filament 157 comprises the wire 155 and a plastic coating. The plastic coating surrounds or encloses the wire 155 such that the plastic coating is essentially fixed to the wire 155. The wire 155 serves as a core of the filament 157. The plastic coating of the filament 157 is formed from the plastic coating of the wire 155. The extruded filament 157 is hot, thereby allowing the extruded filament 157 sections to stick to other filament sections with a plastic outer surface.

In a generic sense, a bamboo strand, a Kevlar wire, a carbon wire, a glass fibre wire, a basalt wire, or other natural fibres like hemp fibres can be used as the wire 155.

In application, the extruded filament 157 with the wire core 155 that is surrounded with a plastic coating provides rigidity and strength to the mesh formwork 14, such that mesh formwork 14 is able to hold a fresh cementitious mixture. Furthermore, the wire 155 of the filament 157 provides good tensional strength. In short, after curing, the coated wire mesh formwork 14 acts as reinforcement.

Figure 23:
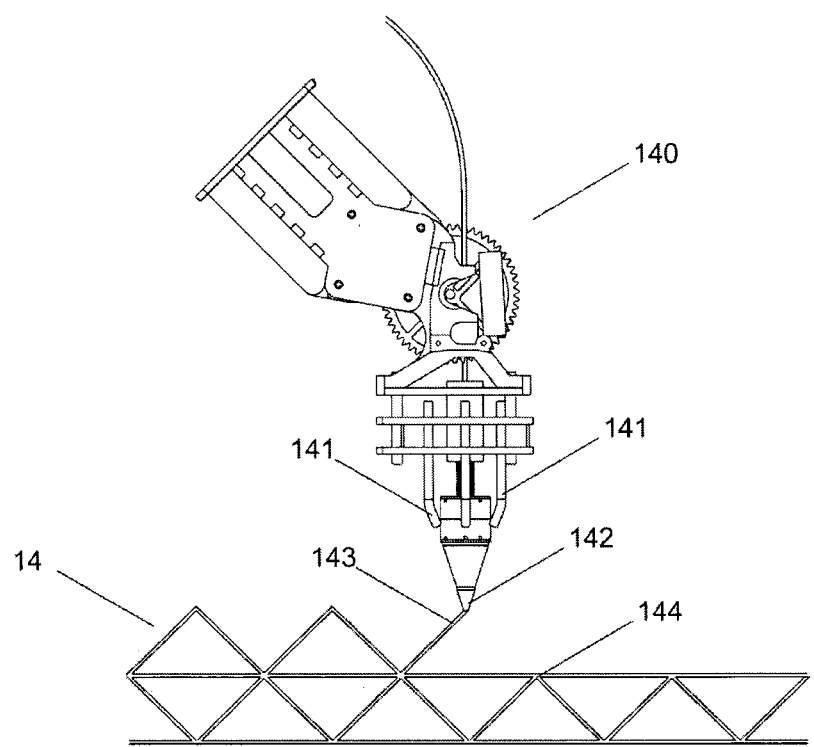
FIG. 23 illustrates one implementation of an end-effector of the robot of FIG. 1 in the form of an extruder head and use thereof to fabricate a reinforced formwork.

FIG. 23 shows details of one implementation of the end-effector 12, in the form of an extruder head 140. In application, the extruded filament 143, which can comprise polymers or polymer coated/coextruded filaments, is used to fabricate a rigid and strong mesh formwork 14, such that the mesh formwork 14 is able to hold a material such as a wet, liquid, or viscous cementitious mixture. The wet, liquid, or viscous cementitious mixture is also called a fresh cementitious mixture. Furthermore, the filament 143 provides good tensional strength to the mesh formwork 14. In short, after curing of the material, for example of the fresh cementitious mixture, the wire mesh formwork 14 acts as reinforcement for the fabricated 3-dimensional structure. FIG. 23 shows the extruder head 140 which in this embodiment comprises cooling air ducts e.g. 141 for directing respective cooling air jets (not shown) to the exit tip 142 of the extruder head, for hardening the extruded filament 143 upon exit from the tip 142, thus providing the mesh formwork 14. As will be appreciated by a person skilled in the art, in regions e.g. 144 where freshly extruded filament 143 sections contact previously extruded sections, a strong joint is formed during the cooling of the freshly extruded sections.

Figure 24:
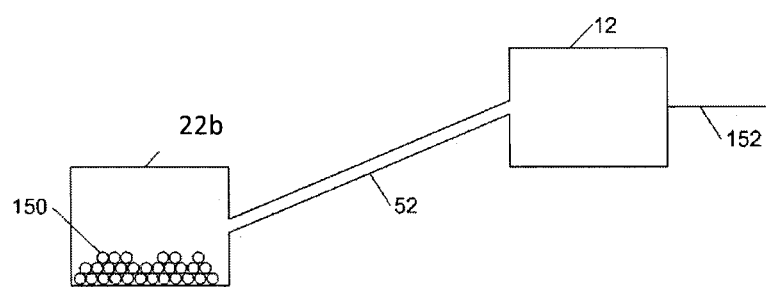
FIG. 24 illustrates a further implementation of the material container of the robot of FIG. 1.

Another implementation of the material container 22 is shown in FIG. 24. FIG. 24 shows a material container 22b that holds an extruding material that comprises a plurality of plastic granules 150. The pipe 52 provides a passageway that allows transfers of the plastic granules 150 to the end-effector 12. The end-effector 12 later heats the plastic granules 150 such that the plastic granules are mouldable. The end-effector 12 afterward expels the plastic granules 150 to form an elongated plastic filament 152. The extruded plastic filament 152 is hot such that it can stick or adhere to other filament with a plastic other surface.

In a general sense, instead of the plastic granules 150, a plurality of plastic sticks or a reel of plastic stick can also be used to produce the plastic filament 152.

In a special embodiment, the extruding material container 22 is mobile for supplying material to the end-effector 12 while not taking limited space such that the robot 10 can have more space for manoeuvring.

In practice, the extruded plastic filament 152 provides rigidity and strength to the mesh formwork 14, such that mesh formwork 14 is able to hold a fresh cementitious mixture.

Figure 25:
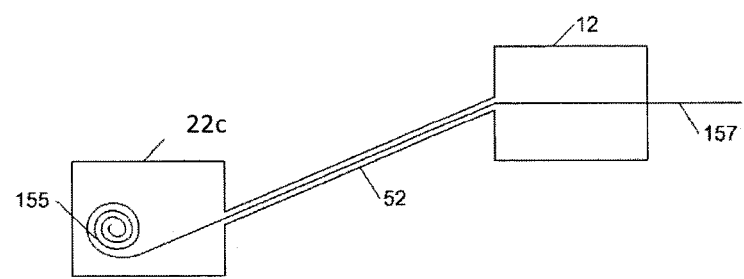
FIG. 25 illustrates another implementation of the material container of the robot of FIG. 1.

Another implementation of the material container 22 is shown in FIG. 25. FIG. 25 shows a material container 22c that holds a reel of elongated metal wire 155. The pipe 52 provides a passageway for transferring the metal wire 155 to the end-effector 12. The end-effector 12 expels a filament 157 with a desired cross-sectional size and/shape. The 3-dimensional position of the end-effector 12 is varied to form the mesh formwork 14 (see FIG. 1).

Figure 26:
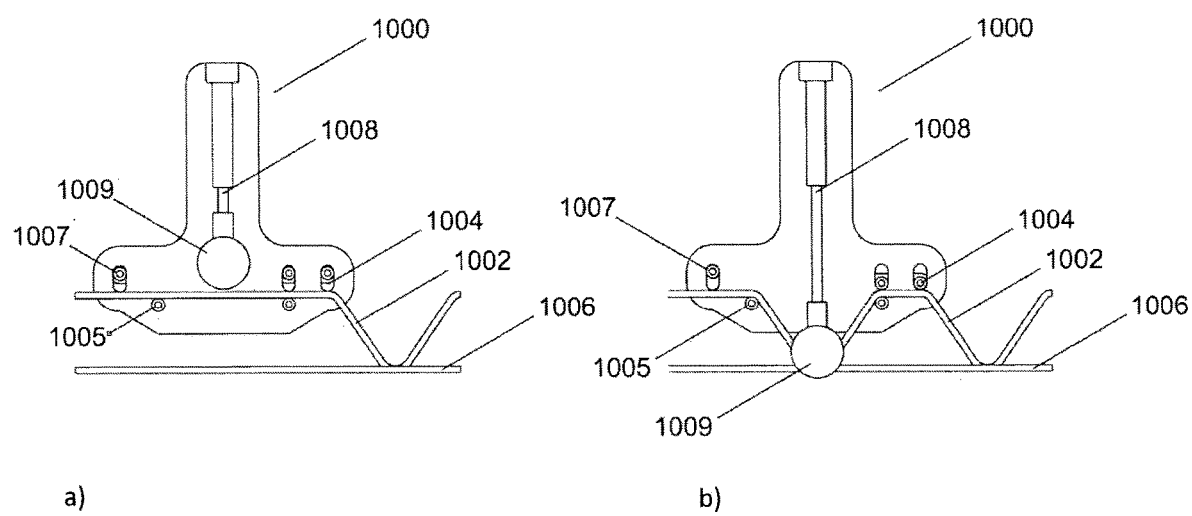
FIG. 26 illustrates one implementation of an end-effector of the robot of FIG. 1 in the form of a bending and welding head and use thereof to fabricate a reinforced formwork.

FIGS. 26a) and b) show details of one implementation of the end-effector 12 in the form of a bending and welding head 1000. In application, for example a metal filament in the form of a suitably sized and shaped metal wire 1002, which may be directly supplied from a reel (not shown) is used to fabricate a rigid and strong mesh formwork 14, such that the mesh formwork 14 is able to hold a material such as a wet, liquid, or viscous cementitious mixture. The wet, liquid, or viscous cementitious mixture is also called a fresh cementitious mixture. Furthermore, the metal wire 1002 provides good tensional strength to the mesh formwork 14. In short, the wire 1002 is fed through guides e.g. 1004, 1005, 1007 of the moving head 1000. For forming a joint to a previously laid wire section 1006, a linear actuator 1008 is moved downward, thus deforming or bending the wire 1002 between the guides e.g. 1004, 1005, 1007, as shown in FIG. 26b. During the bending and welding, moveable ones of the guides e.g. 1004 move to grip the metal wire 1002, to hold it in place. In this embodiment, guide 1007 remains "open" so as to enable feeding of metal wire 1002 to accommodate the bending.

When the linear actuator 1008 has reached a position in which a section of the wire 1002 contacts the previously laid wire section 1006, a welding voltage/current is applied via a welding electrode 1009, for forming a joint.

Figure 27:
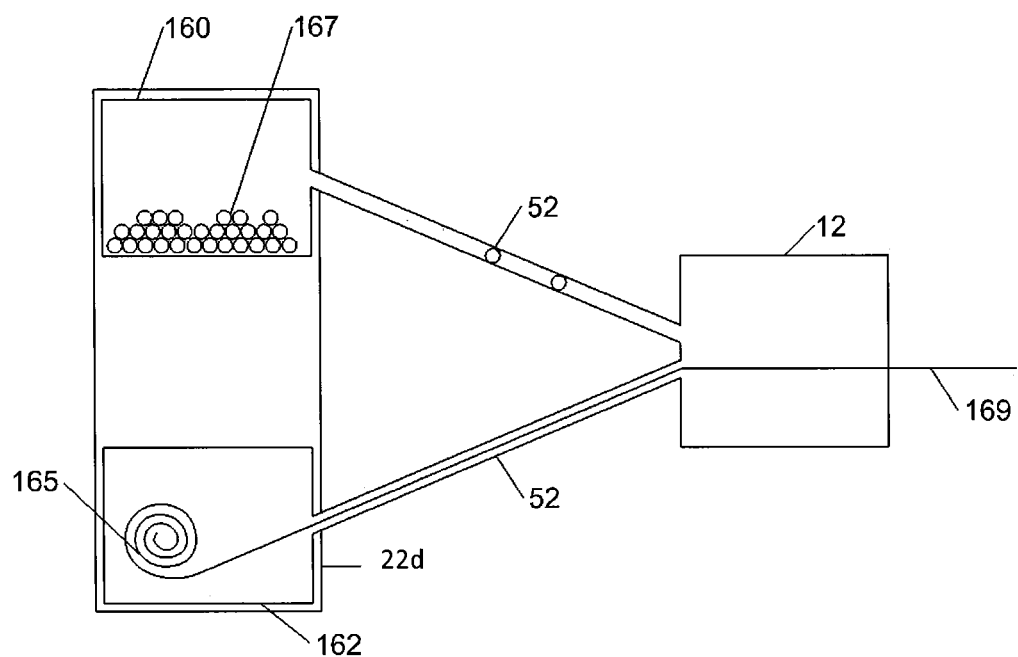
FIG. 27 illustrates another implementation of the material container of the robot of FIG. 1.

A further implementation of the material container 22 is shown in FIG. 27. FIG. 27 shows a material container 22*d* that includes a coating material container 160 and a load-bearing element material container 162.

The load-bearing element material container 162 holds a reel of wire 165 with good tensional strength. The pipe 52 connects the load-bearing element material container 162 thereby allowing the basalt, Kevlar, glass fiber or such wire 165 to reach the end-effector 12.

The coating material container 160 holds a plurality of plastic granules 167. The pipe 52 provides a passageway that allows transfers of the plastic granule 167 to the end-effector 12. The end-effector 12 then heats the transferred plastic granules 167 such that the plastic granules 167 are mouldable.

The end-effector 12 afterward expels the wire 165 and the mouldable plastic granules 167 to form a filament 169 such that the filament 169 comprises a core that includes the wire 165, wherein the core is coated with plastic. The plastic coat, which surrounds the core, is formed from the mouldable plastic granules 167.

Operationally, the extruded filament 169 provides rigidity and strength to the mesh formwork 14, wherein the mesh formwork 14 is able to hold a fresh cementitious mixture. The wire 167 provides good tensional strength to the mesh formwork 14 while the plastic coating facilitates joint forming.

Returning to FIG. 1, the mesh formwork 14 is used for receiving a material such as wet or fresh cementitious mixture, which has a predetermined viscosity, in the cavity 59. The mesh formwork 14 then shapes the cementitious mixture and holds the fresh cementitious mixture.

As mentioned above, the dimensions of the apertures 55, 57 are adapted to the hydrostatic pressure of e.g. a liquid cementitious mixture such that the apertures 55, 57 hold the fresh cementitious mixture. The arrangement of the filament or filaments from which the mesh formwork 14 is fabricated also provides rigidity to the mesh formwork 14 and also facilitates adherence of the cementitious mixture to the mesh formwork 14 Only a small portion of the fresh cementitious mixture flows through the apertures 55, 57 at a predetermined flow rate. This small portion of the fresh cementitious mixture forms the outer surface of the cementitious mixture.

Later the cementitious mixture sets and hardens to form the desired concrete structure. The finished concrete structure has essentially the shape of the mesh formwork 14.

The outer surface of the hardened cementitious mixture can then be smoothed by trowelling or the like, and, if desired, the outer surface can be finished simply by painting or by application of an acrylic render, cementitious render, mortar, and other finishes are also possible.

As apparent from the above description, the mesh formwork 14 is embedded in the cementitious mixture. This is an advantage, as the mesh formwork 14 need not be removed from the concrete structure. This is different from other formworks, wherein the other formworks are removed from the finished concrete structure and are then discarded or reused after big efforts for cleaning lumps of cementitious mixture off these formworks. Furthermore, the mesh formwork 14 can comprise material that allows the mesh formwork 14 to have good tensional strength. Such a tensile-active formwork can provide a benefit to concrete structures. For example, concrete structures generally have good compressive strength and poor tensional strength. When these concrete structures are embedded with this formwork 14, these concrete structures have both good compressive strength and good tensional strength in that the tensile active formwork takes up the tensional stresses of the hardened concrete structure.

This formwork 14 can also replace or reduce reinforcement bars, which are typically embedded in the fresh cementitious mixture. The shape of the formwork 14 can be adjusted to various loads, which allows saving of construction material.

FIGS. 2 to 5 show different views of the mesh formwork 14.

The mesh formwork 14 includes a plurality of straight filament sections and a plurality of connecting filament sections, wherein the connecting filaments are attached to the straight filaments.

In particular, the mesh formwork 14 includes a first structure and a second structure of filaments. The first structure and the second structure have similar parts and are arranged in a similar manner.

Figure 2:
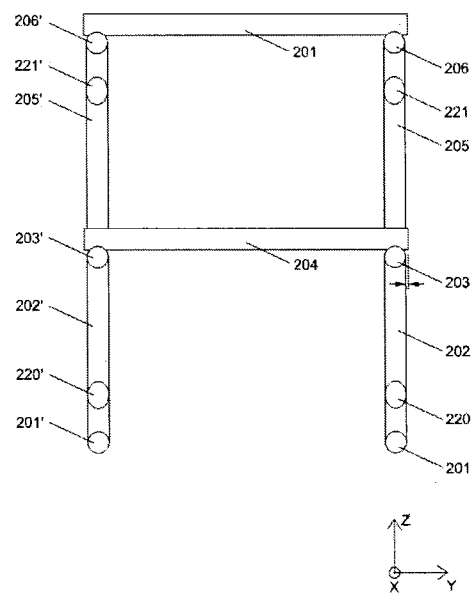
FIG. 2 illustrates a side cross-sectional view of the fabricated mesh formwork of FIG. 1.
Figure 3:
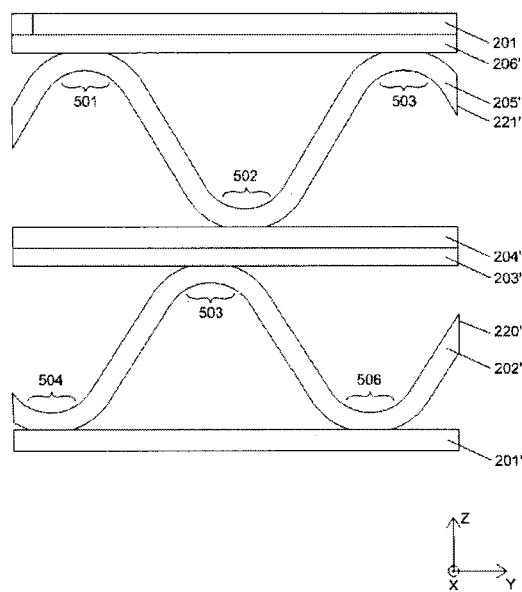
FIG. 3 illustrates another side cross-sectional view of the fabricated mesh formwork of FIG. 1.

As seen in FIGS. 2 and 3, the first structure has a plurality of first straight filament sections 201', 203', and 206' and a plurality of first connecting filament sections 202' and 205'. The first straight filament sections 201', 203', and 206' are placed in a first XZ plane. The first straight filament section 203' is placed above the first straight filament section 201' while the first straight filament section 206' is placed above the first straight filament section 203'.

The first connecting filament section 202' connects to the first straight filament section 201' and to the first straight filament section 203'. The first connecting filament section 202' has essentially a shape of a sine curve. The sine curve has peaks and troughs. The peaks and troughs are also called turning areas 501, 502, 503, 504, 505, and 506. These turning areas 504 and 506 are connected to the first straight filament section 201' while the turning area 505 is connected to the first straight filament section 203'.

In a manner similar to the above, the first connecting filament section 205' connects to the first straight filament section 203' and to the first straight filament 206'.

Referring to the second structure, it includes a plurality of second straight filament sections 201, 203, and 206 and a plurality of second connecting filament sections 202 and 205.

These filament sections of the second structure are arranged in a manner similar to the filament sections of the first structure.

The mesh formwork 14 also includes cross connecting filament sections 204 and 207.

Figure 4:
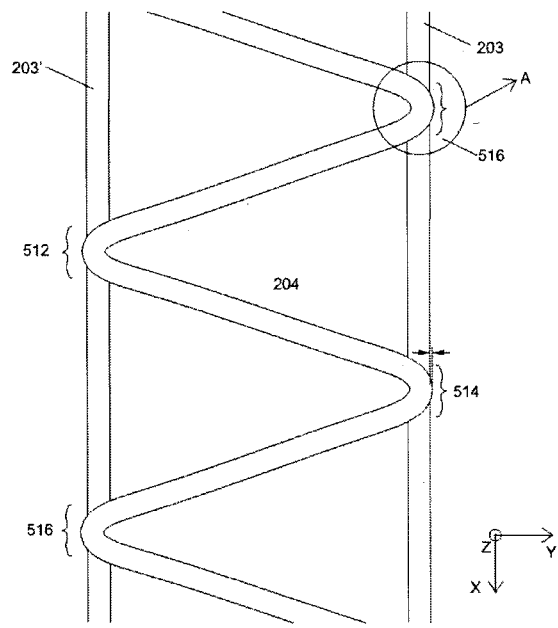
FIG. 4 illustrates a top view of a part of the fabricated mesh formwork of FIG. 1.

As seen in FIG. 4, the cross connecting filament section 204 has a shape of a sine curve. Turning areas 512 and 516 of the sine curve are attached to the first straight filament section 203' while turning areas 510 and 514 are connected to the second straight filament section 203.

Similarly, as seen in FIG. 2, the cross connecting filament section 207 is attached to the first straight filament section 206' and to the second straight filament section 206.

Figure 5:
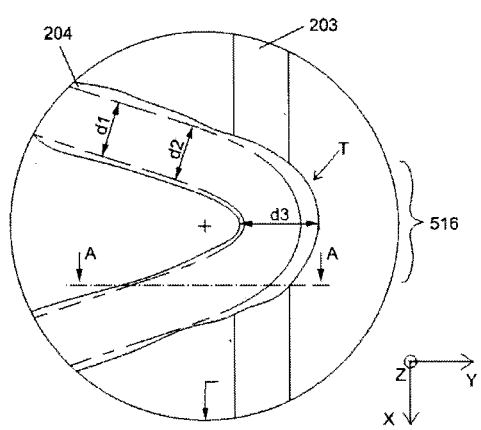
FIG. 5 illustrates an expanded view of a portion of the fabricated mesh formwork of FIG. 4.

FIG. 5 shows a joint between the second connecting filament section 204 and the second straight filament section 203.

The turning area 510 of the second connecting filament section 204 is attached to a portion of the second straight filament section 203. The turning area 510 has a first portion with a width d1, a second portion with a width d2, and a turning portion with a width d3. The first portion is integrally connected to the second portion while the second portion is integrally connected to the turning portion.

The width d1 is less than the width d2 while the width d2 is less than the width d3. These widths d1, d2, and d3 are different because the second filament section 204 is formed by extrusion at different speeds and at different angles. In other words, the different widths d1, d2, and d3 are marks or characteristics of the extrusion process.

Figure 6:
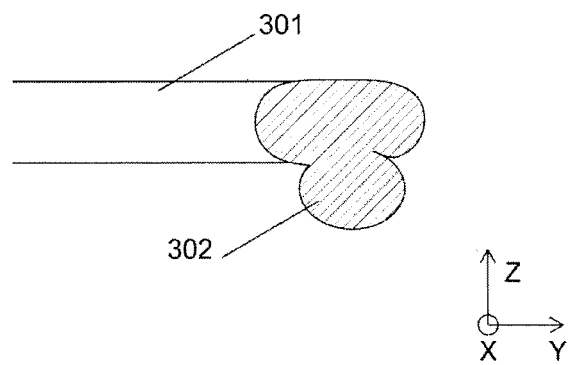
FIG. 6 illustrates a cross-sectional view of a joint of two filaments for an extruded mesh formwork of FIG. 1.

FIG. 6 shows a cross-sectional view of a further joint of two extruded filament section s 301 and 302 for the mesh formwork 14.

The two filament sections 301 and 302 have an elongated cylindrical shape with an essentially round cross-section. The filament sections 301 and 302 are produced by extrusion using a polymer. The two filament sections 301 and 302 are placed at a pre-determined angle with respect to each other. Portions of the filament sections 301 and 302, which are jointed to each other have a flatten shape. The shape of the joint is a mark or characteristic of the extrusion process.

Figure 7:
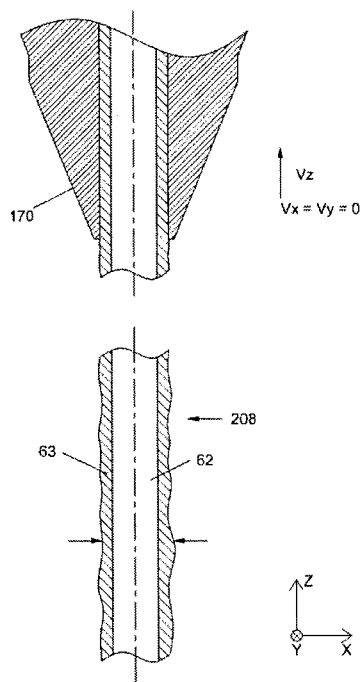
FIG. 7 illustrates a cross-sectional view of a filament that is extruded from an extruder head of the robot of FIG. 1 along a longitudinal axis of the extruder head.

FIG. 7 shows a cross-sectional view of a filament section 208 that is extruded by the extruder head 170 in a longitudinal direction of the filament section 208.

The filament section 208 has an elongated cylindrical core 62 and an elongated tubular coating 63 that surrounds the core 62. The core 62 has an essentially constant cross-section while the coating 63 has different external diameters D at different areas of the coating 63.

While extruding the filament section 208, the extruder head 170 is moving with velocity Vz in the longitudinal direction of the filament section 208, as indicated by an arrow in FIG. 7. The velocity Vz changes over time. Because of this, the external diameters D of the coating 63 are different at different areas of the coating 63. These different external diameters D are characteristics or marks of the changing velocity Vz of the extrusion process of the filament section 208.

Figure 8:
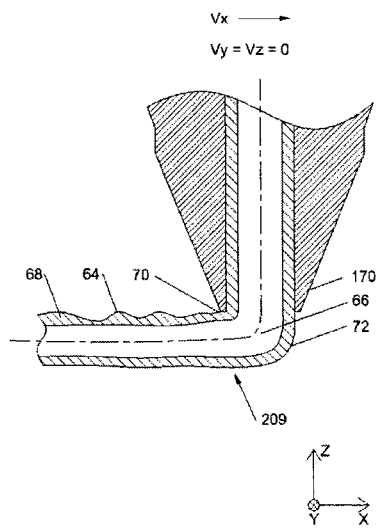
FIG. 8 illustrates a cross-sectional view of a filament that is extruded from the extruder head of the robot of FIG. 1 along a lateral axis of the extruder head.

FIG. 8 shows a cross-sectional view of another filament section 209 that is extruded by the extruder head 170 in a lateral direction of the filament 209.

The filament section 209 has an elongated cylindrical core 66 and an elongated tubular coating 68 that surrounds the core 66. The core 66 has an essentially constant cross-section while the coating 68 has protrusions 64 on an inner surface 70 of the coating 68 and gentle irregularities on an outer surface 72 of the coating 68. The inner surface 70 is opposite to the outer surface 72.

During the extrusion of the filament section 209, the extruder head 170 is moving with velocity Vx in the lateral direction of the filament section 208, as indicated by an arrow in FIG. 7. The velocity Vx changes over time. These protrusions 64 are marks or characteristics of the changing velocity Vx of the extrusion process of the filament section 209.

Figure 9:
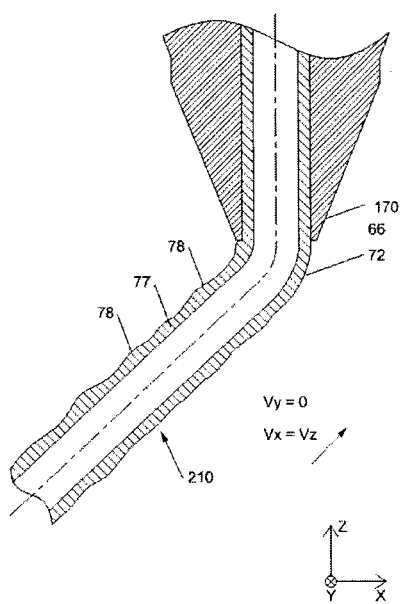
FIG. 9 illustrates a cross-sectional view of a filament that is extruded diagonally from the extruder head of the robot of FIG. 1.

FIG. 9 shows a cross-sectional view of a further filament section 210 that is extruded diagonally from the extruder head 170 in a lateral direction of the filament section 210, as indicated by an arrow in FIG. 9.

The filament section 210 has an elongated cylindrical core 75 and an elongated tubular coating 77 that surrounds the core 75. The core 75 has an essentially constant cross-section while the coating 77 has protrusions 78 on one side of the coating 77.

When extruding the filament section 210, the extruder head 170 is moving with velocity Vx in the lateral direction and with velocity Vz in the longitudinal direction of the filament section 210, as indicated by an arrow in FIG. 9. The velocities Vx and Vz change over time. These protrusions 78 are marks or characteristics of changing velocities Vx and Vz of the extrusion process of the filament section 210.

Different means of force locking one filament section to another filament section are possible.

Figure 10:
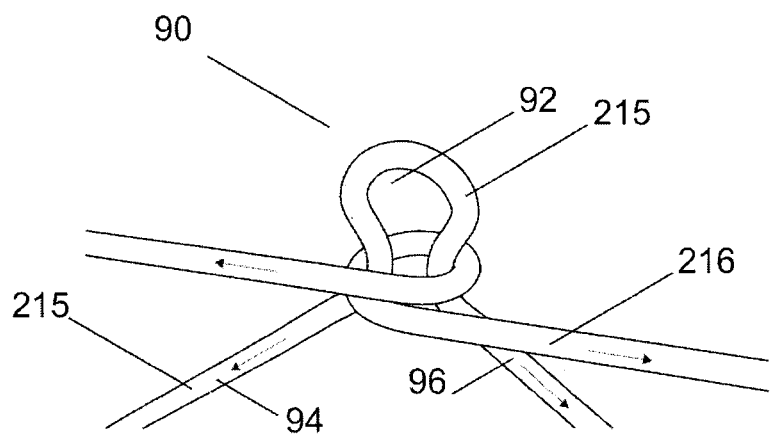
FIG. 10 illustrates a force locking of two filaments for an extruded mesh formwork of FIG. 1.
Figure 11:
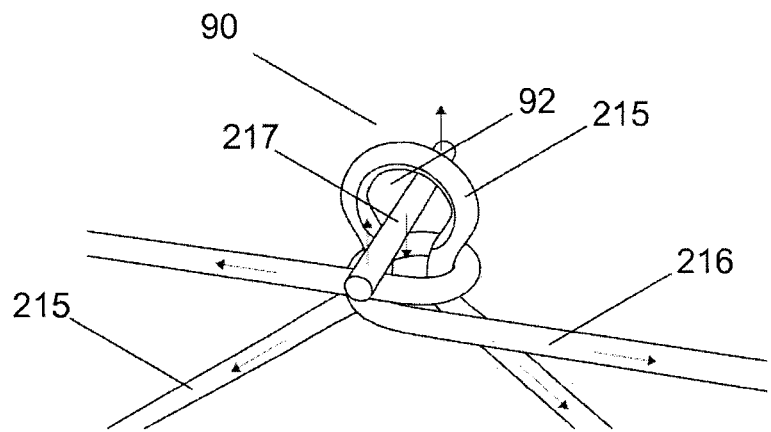
FIG. 11 illustrates the force locking of FIG. 12 with a further filament.

FIGS. 10 to 11 show a force locking 90 of filament sections via a knot for the mesh formwork 14. The knot refers to parts of the filament section that are tied or twisted together to form a lump for fastening or tying together.

FIG. 10 shows a force locking 90 of an extruded first filament section 215 with an extruded second filament section 216. The first filament section 215 has a loop 92 with a partly open curve.

A first connecting part integrally attaches one end of the partly open curve to one end of a first straight filament element 94. A second connecting part integrally attaches another end of the partly open curve to one end of a second straight filament element 96. Referring to the second filament section 216, it loops around the first and the second connecting parts.

FIG. 11 shows a third filament section 217 passing through the loop 92. FIG. 11 also shows shearing forces of the first and the second filament sections 215 and 216.

These shearing forces can be present when the first, the second, and the third filament sections 215, 216, and 217 are embedded in a cementitious mixture and when tensional forces are applied to the cementitious mixture. The tensional forces extend the first filament section 215 and the second filament section 216 such that these filament sections 215 and 216 are subjected to the shearing forces. The loop 92 later tightens around the third filament section 217.

In summary, FIGS. 9 to 10 show a pseudo weaving of a mesh formwork.

Figure 12:
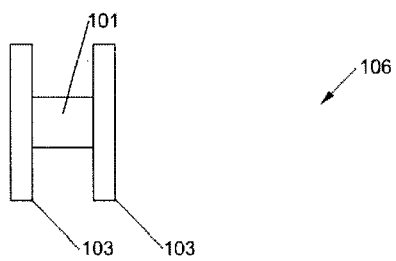
FIG. 12 illustrates a side view of a device for a further force locking of filaments for an extruded mesh formwork of FIG. 1.

FIG. 12 shows a side view of a filament device 106 for a further force locking of filament sections for the extruded mesh formwork 14. The device includes a straight filament section 99, wherein end portions of the straight filament section 99 are connected to filament discs 103.

Figure 13:
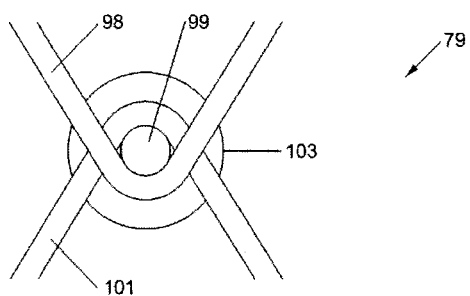
FIG. 13 illustrates another side view of a further force locking of filaments using the device of FIG. 12, FIG. 14 illustrating a roughing of a filament for the mesh formwork of FIG. 1.

FIG. 13 shows another side view of a further force locking of filament sections using the device 106. FIG. 13 shows a first filament section 98 looping over the straight filament section 99 and contacting with the straight filament section 99 from one direction and a second filament section 101 looping over and contacting with the straight filament section 99 from an opposite direction.

Figure 14:
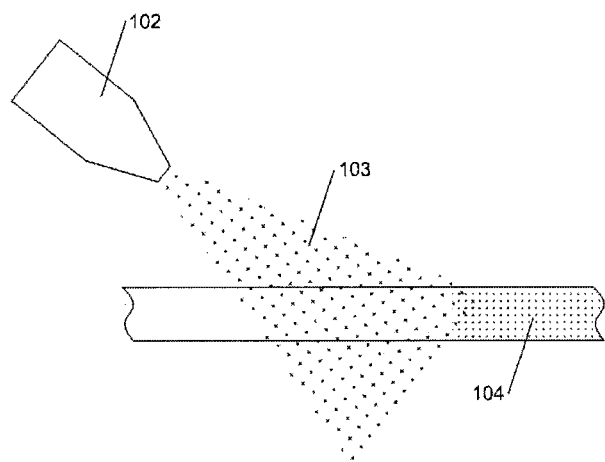

FIG. 14 shows a roughing of a filament for the extruded mesh formwork 14. FIG. 14 shows a nozzle 102 spraying sand 103 over a surface of a filament section 104. The surface of the filament section 104 is made from plastic and is also hot and mouldable such that the sand 103 sticks to the surface. When cooled, the surface of the filament section 104 is roughened for connecting with a cementitious mixture that surrounds the filament section 104 in a form-fitting manner.

Figure 15:
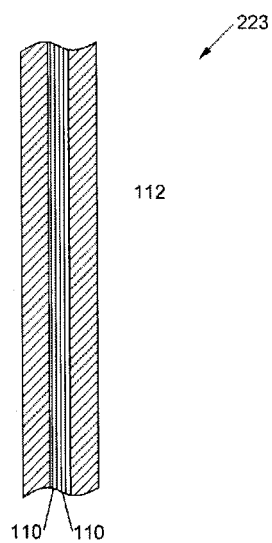
FIG. 15 illustrates a cross-sectional view of a filament that comprises a bundle of steel wires filament and a coating for the mesh formwork of FIG. 1.

FIG. 15 shows a further extruded filament 223 for the mesh formwork 14. The filament section 223 comprises an extruded bundle of wires 110 and an extruded polymer coating 112 that surrounds the wires 110. The bundle of wires 110 provides extended mechanical strength. In a general sense, fibres can replace the wires 110. The wires 110 or fibres may comprise, for example, bamboo strand, Kevlar wire, carbon wire, glass fibre wire, basalt wire, or other natural fibres like hemp fibres.

Different ways of using the mesh formwork are possible.

Figure 16:
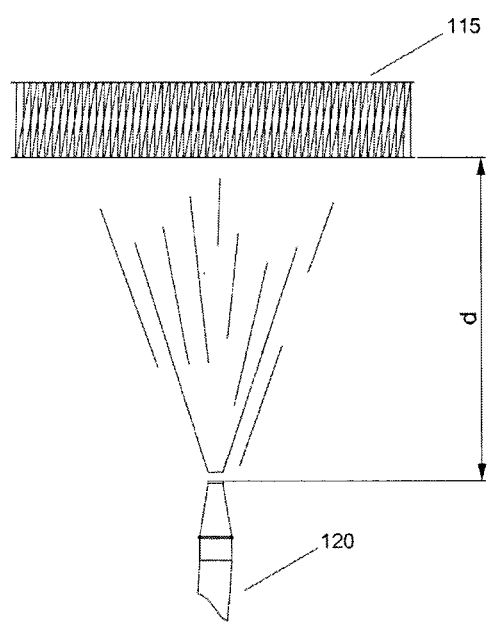
FIG. 16 illustrates filling the mesh formwork of FIG. 1 with a cementitious mixture by spraying for fabricating a concrete structure.

FIG. 16 shows an extruded mesh formwork 115 being sprayed with cementitious mixture, in the form of Shotcrete in an example embodiment, from a hose 120 from a distance d of, for example, at least 30 centimetres (cm).

The formwork 115 comprises a plurality of filaments in which the filaments define apertures. The filaments are not shown in FIG. 15. The apertures are adapted for a cementitious mixture spraying process, i.e. the apertures are adapted to the dynamic pressure during the spraying process, as well as to the hydro-static pressure of the accumulated material.

In use, a fresh cementitious mixture is conveyed through the hose 120 and is pneumatically projected at high velocity onto a surface of the mesh formwork 115. The fresh cementitious mixture coats the filaments of the formwork 115. The apertures are larger on the front section of the formwork 115 (as seen from the hose 120) for the Shotcrete to easily enter the cavity formwork 115. The apertures on the back section of the formwork 115 are smaller to prevent the concrete from shooting through the mesh. The apertures on both the front and the back sections is further adapted to the hydro-static pressure of the accumulated Shotcrete.

In another embodiment, instead of spraying, the fresh cementitious mixture is pressed onto the mesh from the outside of the mesh towards the inside of the mesh either by a trowel or by a concrete pump from a distance d of, for example, about 10 cm.

In one implementation, the fresh cementitious mixture covers and closes the apertures of the formwork 115.

Figure 17:
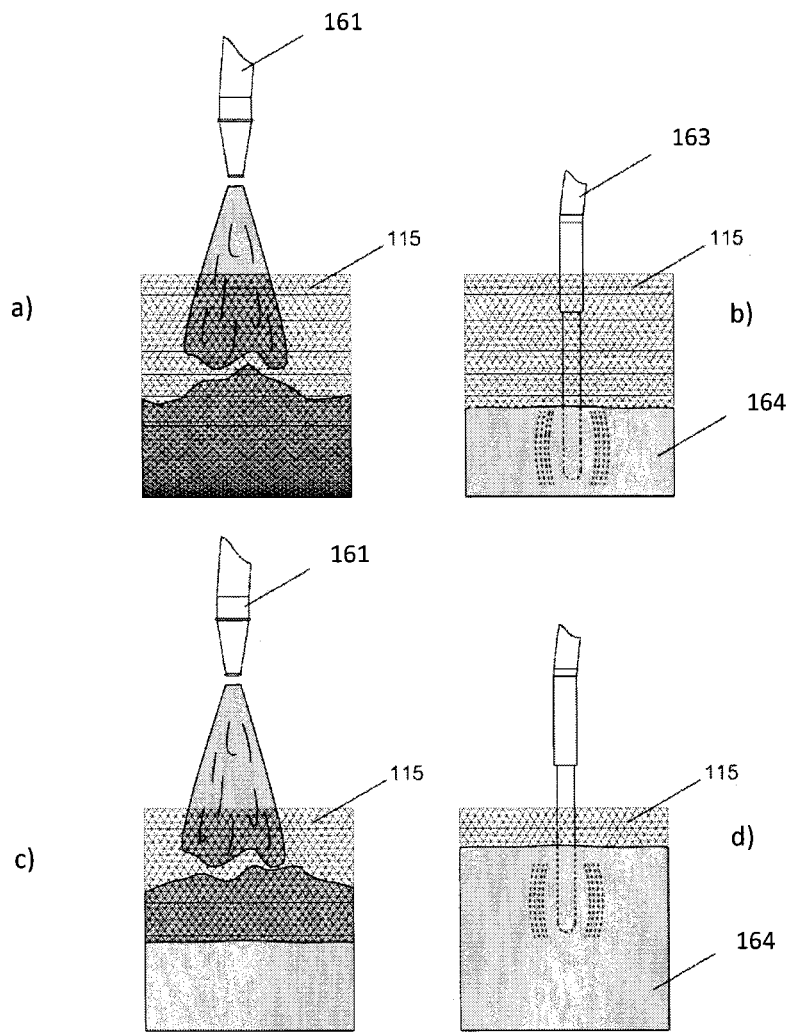
FIG. 17 illustrates filling the mesh formwork of FIG. 1 with a cementitious mixture by pouring for fabricating a concrete structure.

FIG. 17 shows an extruded mesh formwork 115 being filled with fresh cementitious mixture from a hose 161 from the top of the formwork 115.

The formwork 115 comprises a plurality of filaments in which the filaments define apertures. The apertures are adapted for a cementitious mixture filling process, i.e. the apertures are adapted to the dynamic pressure during the filling process, as well as to the hydro-static pressure of the accumulated material.

In use, the fresh cementitious mixture is conveyed through the hose 161 and is pneumatically projected at moderate velocity into the cavity of the mesh formwork 115, as shown in FIG. 17a). The fresh cementitious mixture fills the cavity up to a selected first height, which levels, after being conventionally treated with a concrete vibrator 163, as a first layer 164, as shown in FIG. 17b).

Next, fresh cementitious mixture is again conveyed through the hose 161 and is projected at moderate velocity, into the cavity of the mesh formwork 115, and on top the first layer 164, as shown in FIG. 17c). The first layer is not allowed to entirely harden prior to the next filling of fresh cementitious mixture, so as to preferably ensure that a structurally homogenous 3-dimensional structure is formed upon hardening. The fresh cementitious mixture now fills the cavity up to a selected accumulated height, which levels, optionally facilitated by application of the concrete vibrator 163, as shown in FIG. 17d). This optionally temporarily increases the fluidity of the cementitious mixture, which also facilitates spreading or protruding of the cementitious mixture through the apertures, which in turn facilitates embedding of the mesh formwork 115.

This process is repeated until the entire mesh formwork is filled.

As the formwork 115 is produced by a robot using extrusion, the formwork 115 can have various shapes. This is unlike other formwork techniques, which can only produce certain shapes at low cost.

Figure 18:
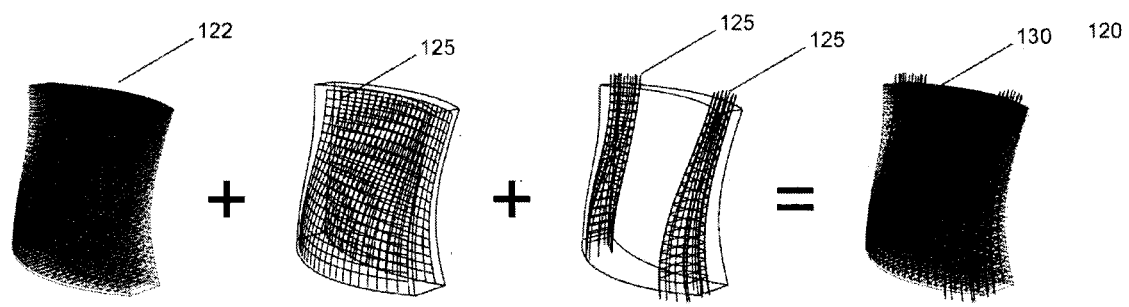
FIG. 18 illustrates a reinforced formwork fabricated by the robot of FIG. 1.

FIG. 18 shows a reinforcement formwork 120 for producing a reinforced concrete structure.

The reinforcement formwork 120 includes an extruded mesh formwork 122 that is fabricated by the robot 10 and a plurality of reinforcement structures 125, such as metal bars and/or meshes, wherein the reinforcement structures 125 are inserted in the mesh formwork 122, as illustrated for better clarity in the sequential diagrams on the left side of FIG. 18. In one method of using the reinforcement formwork 120, the reinforcement structures 125 are inserted in the mesh formwork 122. After this, fresh cementitious mixture is poured inside the mesh formwork 122. The mesh formwork 122 holds the fresh cementitious mixture while a small portion of the fresh cementitious mixture seeps through apertures of the mesh formwork 122. The fresh cementitious mixture essentially takes the shape of the mesh formwork 122 while the mesh formwork 122 and the reinforced structures 125 are embedded in the cementitious mixture. When the cementitious mixture hardens, the cementitious mixture forms a reinforced concrete structure. The reinforcement structures 125 allow the finished concrete structure to have good tensional strength while the hardened cementitious mixture allows the finished cementitious mixture to have good compressive strength.

Figure 19:
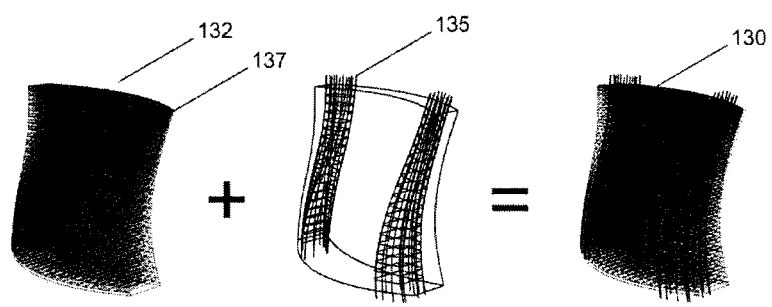
FIG. 19 illustrates a further reinforced formwork fabricated by the robot of FIG. 1.

FIG. 19 shows a further reinforced formwork 130 for producing a reinforced concrete structure.

The reinforcement formwork 130 comprises an extruded reinforced mesh formwork 132 that is fabricated by the robot 10 and a plurality of reinforcement structures 135. The reinforcement structures 135 are inserted in the reinforced mesh formwork 132, as illustrated for better clarity in the sequential diagrams on the left side of FIG. 19. The reinforced mesh formwork 132 is formed from a filament or filaments 137 that have good tensional strength.

The reinforcement formwork 130 can be used to produce a further reinforced concrete structure using a method that is similar to the above method.

The filament or filaments 137 and the reinforcement bars 135 allow the finished concrete structure to have good tensional strength. The filament or filaments 137 can also act to replace some of the reinforcement structures, thus reducing the number of reinforcement structures 135 used in the concrete structure. In effect, tensional forces are distributed or shared between the reinforcement structures 135 and the reinforcement formwork 130.

Figure 20:
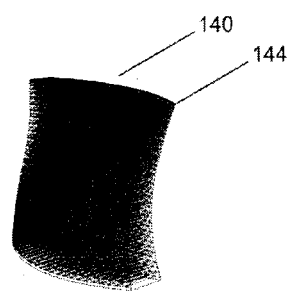
FIG. 20 illustrates another reinforced formwork fabricated by the robot of FIG. 1.

FIG. 20 shows an extruded reinforced mesh formwork 140 for producing a reinforced concrete structure.

The robot 10 fabricates the reinforced mesh formwork 140 using an end-effector, for example in the form of an extrusion head or a bending and welding head. The mesh formwork 140 is formed from a filament or filaments 144 with good tensile strength.

In one method of using the mesh formwork 140, a fresh cementitious mixture is poured into the mesh formwork 140. The fresh cementitious mixture takes the shape of the mesh formwork 140. The mesh formwork 140 is embedded in the cementitious mixture. After the cementitious mixture hardens, the cementitious mixture forms a concrete structure.

The filament or filaments 144 allow the finished concrete structure to have good tensional strength. The mesh formwork 140 acts as reinforcement element to strengthen the finished concrete structure, advantageously without the need to add any reinforcement structures.

Figure 21:
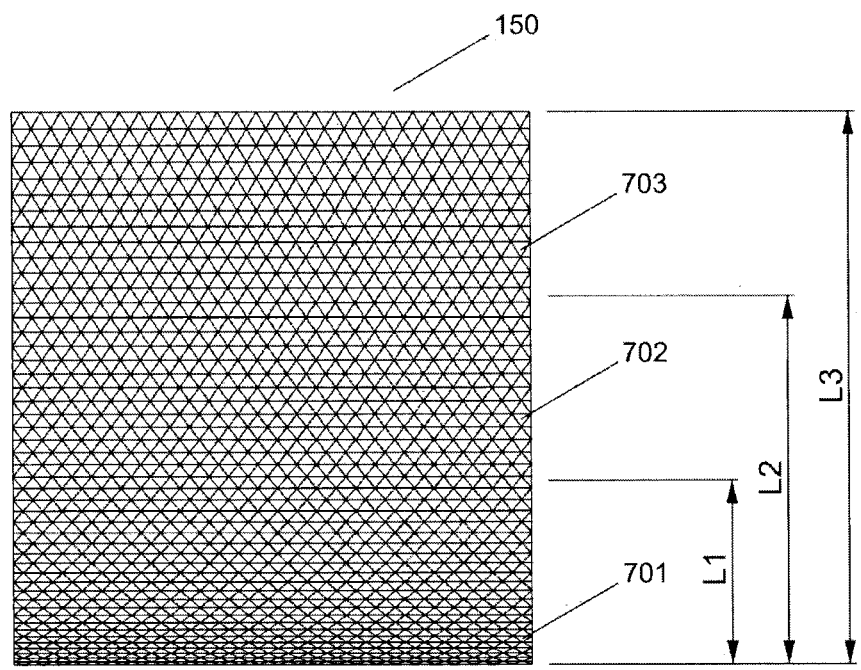
FIG. 21 illustrates a further fabricated mesh formwork with different apertures at different heights.

FIG. 21 shows a further extruded mesh formwork 150, which is produced by a robot. The formwork 150 is intended for producing a concrete structure.

The mesh formwork 150 comprises a plurality of filament sections, wherein the filament sections define different apertures 701, 702, and 703 at different heights or levels L1, L2, and L3, i.e. the apertures differ as a function of height. The dimensions of the apertures 701, 702, or 703 at the same level are essentially the same while the dimensions of the apertures 701, 702, and 703 at different levels L1, L2, and L3 are different. For example, the apertures 703 at the level L3 are bigger than the apertures 702 at the level L2, wherein the level L3 is higher than the level L2. Similarly, the apertures 702 at the level L2 are bigger than the apertures 701 at the level L1, wherein the level L2 is higher than the level L1. In one implementation, the width of the apertures stays the same, while the height is gradually changing.

The apertures 701, 702, and 703 are adapted for holding a fresh cementitious mixture with a predetermined viscosity. The hydrostatic pressures of the cementitious mixture at different levels L1, L2, and L3 are different. The hydrostatic pressure of a lower part of the cementitious mixture is higher than the hydrostatic pressure of a higher part of the cementitious mixture. The apertures 701, 702, or 703 at a particular level L1, L2, or L3 are adapted to the hydrostatic pressures of the cementitious mixture at that level L1, L2, or L3. Because of this, the dimensions of the apertures 701, 702, and 703 at different heights L1, L2, and L3 are different for adapting to different hydrostatic pressures of the fresh cementitious mixture at the respective levels.

In use, a fresh cementitious mixture with a pre-determined flow viscosity is poured into the formwork 150, wherein the formwork 150 holds the fresh cementitious mixture.

A small portion of the fresh cementitious mixture then seeps or protrudes through the different apertures 701, 702, and 703 at different levels L1, L2, and L3 at essentially the same flow rate, such that the cementitious mixture takes on the shape of, and embeds, the formwork 150, i.e., without flowing out of the apertures to an extent that the fresh concrete "collapses" out of the formwork. Later, optionally after vibrating, troweling and/or smoothing to facilitate a better embedding of the formwork 150, the cementitious mixture hardens to form the finished concrete structure.

The extrusion of the apertures 701, 702, and 703 has an advantage in that the extrusion allows different apertures 701, 702, and 703 to be fabricated for adapting to different hydrostatic pressures of the cementitious mixture at different levels L1, L2, and L3.

It is noted that the dimensions of the apertures may alternatively or additionally differ across the formwork 150 due to the desired 3-dimensional shape of the formwork, including that the sizes of the apertures can differ at the same height.

Figure 28:
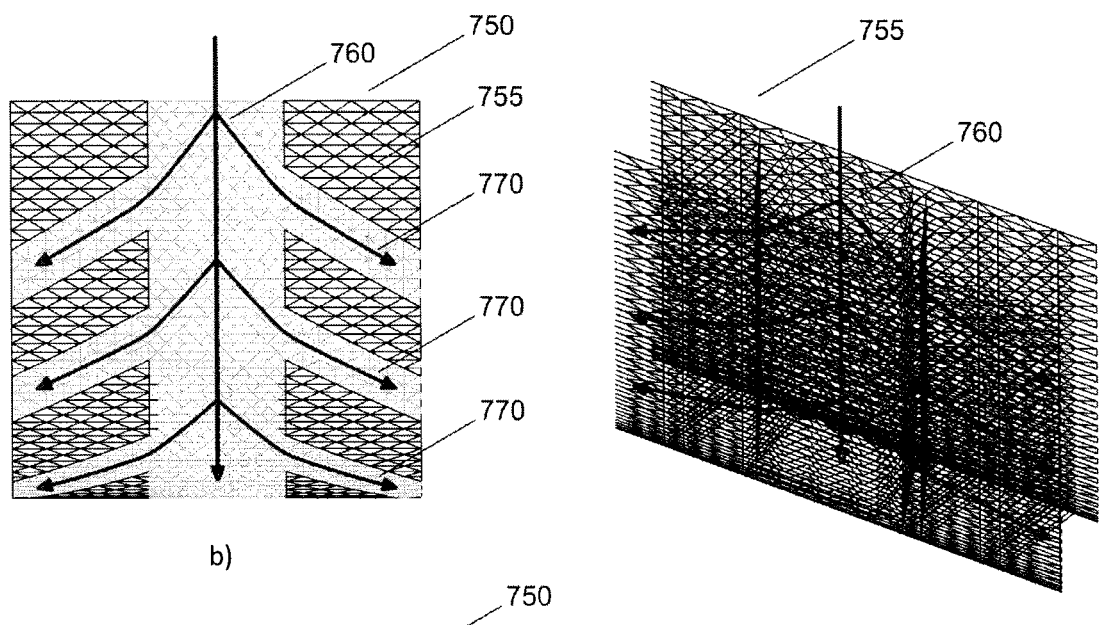
FIG. 28 illustrates a cross-sectional view of a fabricated mesh formwork with channels for receiving a fresh cementitious mixture.

FIGS. 28*a*), *b*) and *c*) show a top view, a cross-sectional view and a perspective view of an extruded mesh formwork 750, wherein the mesh formwork 750 comprises a mesh 755 with substantially vertical channels 760 and with channels 770, which extend in a substantially horizontal direction at an inclination for facilitating distribution of the fresh cementitious mixture.

The channels 760, 770 are defined by gaps between adjacent mesh structures inside the mesh formwork 750, or by apertures of increased size compared to other regions of the mesh structure inside the mesh formwork 750.

In use, the fresh cementitious mixture (not shown) is poured into the channels 760 from the top. The channels 760, 770 are defined by regions in which no mesh structure is provided across the cavity between the opposing front- and back-sides of the mesh formwork 750, or by mesh structures across the cavity between the opposing front- and back-sides of the mesh formwork 750 with larger apertures and/or reduced vertical density.

The channels or ducts 760 and 770 facilitate distributing the fresh cementitious mixture. In particular, the channels 760 receive the fresh cementitious mixture and allow the received fresh cementitious mixture to flow to inside parts of the mesh 755. The channel 770 allows the fresh cementitious mixture to flow from the channels 760 to another inside part of the mesh 755. In this manner, the mesh 755 is filled with the fresh cementitious mixture.

Figure 29:
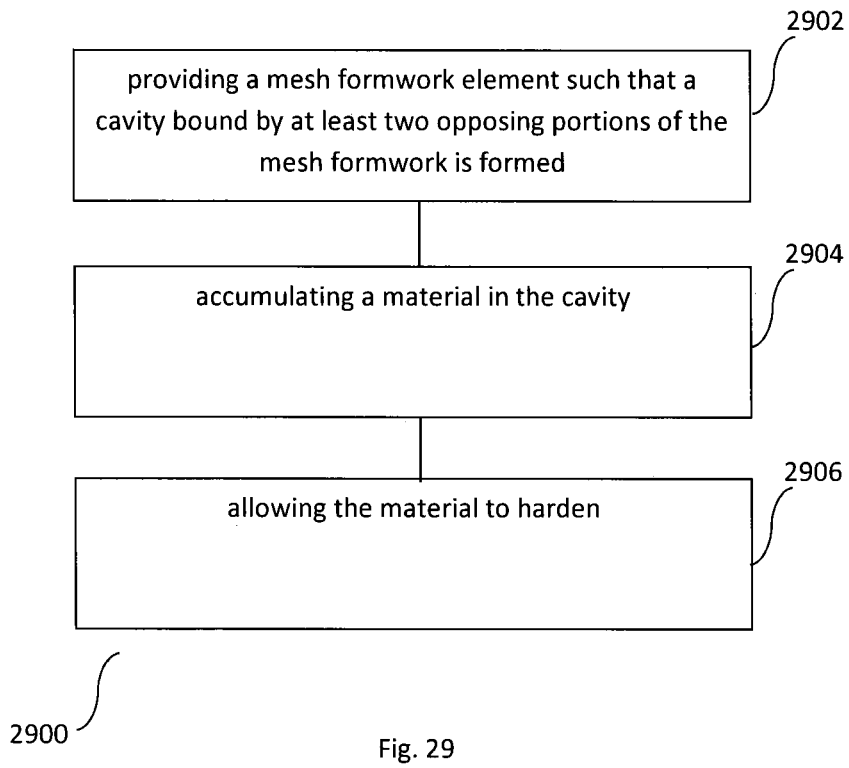
FIG. 29 illustrates a flowchart for fabricating a 3-dimensional structure, according to an example embodiment.

FIG. 29 shows a flowchart 2900 illustrating a method of fabricating a 3-dimensional structure, according to an example embodiment. At step 2902, a mesh formwork element is provided such that a cavity bound by at least two opposing portions of the mesh formwork is formed. At step 2904, a material is accumulated in the cavity. At step 2906, the material is allowed to harden, wherein apertures in the at least two opposing portions of the mesh formwork element are adapted to the hydro-static pressure of the accumulated material or vice versa such that at least two surfaces of the hardened material substantially take on the respective shapes defined by the two opposing portions of the mesh formwork element.

The material may protrude through the apertures before hardening. The material may embed the mesh formwork element such that the mesh formwork element re-enforces the 3-dimensional structure.

The mesh formwork element may comprise an irregular arrangement of the apertures providing a desired 3-dimensional shape of the mesh formwork element.

Providing the mesh formwork element may further comprise forming a mesh structure between the at least two opposing portions and across the cavity. The mesh structure may be connected to the at least two opposing surfaces of the mesh formwork element for supporting the at least two opposing surfaces in their respective shapes. A size of apertures in the mesh structure may differ from a size of the apertures in the at least two opposing portions of the mesh formwork element near the connections to the mesh structure. The method may further comprise providing one or more channel regions in the mesh structure to facilitate accumulating the material in the cavity. The channel regions may be defined by apertures of increased size compared to other regions of the mesh structure. The channel regions may be defined in gaps between adjacent mesh structures.

The mesh formwork element may be provided such that the cavity is bound by four surface portions of the mesh formwork element. The mesh formwork element may be formed from a filament material chosen for increasing tensile strength of the 3-dimensional structure. The mesh formwork element may comprise force locked filament sections for increasing tensile strength of the 3-dimensional structure. The force locked filament sections may comprise weld joints.

The method may further comprise inserting one or more re-enforcement structures in the mesh formwork element for increasing tensile strength of the 3-dimensional structure.

The size of the apertures in the at least two opposing portions of the mesh formwork element may vary, for example as a function of applicable force and/or a desired 3-dimensional shape.

The accumulating the material in the cavity may comprise providing a base surface through which the material can substantially not penetrate, the base surface bounding the cavity. The base surface may be provided by a foundation surface on which the structure is being fabricated.

The accumulating of the material may comprise filling the cavity with the material layer-by-layer. The material in one layer may not be allowed to fully harden before a next layer is provided directly adjacent said one layer.

The accumulating of the material may comprise pouring or spraying the material into the cavity. The material may comprise one or more of a group consisting of a cementitious mixture, a foam, and resin.

The method may comprise providing a mesh formwork structure comprising a plurality of the mesh formwork elements and accumulating the material in the respective cavities of the mesh formwork elements and allowing the material to harden.

The apertures in one or more of the at least two opposing portions of the mesh formwork element may be adapted to a dynamic pressure during the accumulating of the material or vice versa.

A mesh formwork element for fabricating a 3-dimensional structure according to an example embodiment comprises a cavity bound by at least two opposing portions of the mesh formwork element; wherein apertures in the at least two opposing portions of the mesh formwork element are adapted to the hydro-static pressure of a material intended to be accumulated in the cavity for formation of the 3-dimensional structure, such that at least two surfaces of the hardened material substantially take on the respective shapes defined by the two opposing portions of the mesh formwork element.

The mesh formwork element may comprise an irregular arrangement of the apertures providing a desired 3-dimensional shape of the mesh formwork element.

The mesh formwork element may further comprise a mesh structure between the at least two opposing portions and across the cavity. The mesh structure may be connected to the at least two opposing surfaces of the mesh formwork element for supporting the at least two opposing surfaces in their respective shapes. A size of apertures in the mesh structure may differ from a size of the apertures in the at least two opposing portions of the mesh formwork element near the connections to the mesh structure. The mesh formwork element may further comprise one or more channel regions in the mesh structure to facilitate accumulating the material in the cavity. The channel regions may be defined by apertures of increased size compared to other regions of the mesh structure. The channel regions may be defined in gaps between adjacent mesh structures.

The cavity may be bound by four surface portions of the mesh formwork element.

The mesh formwork element may be formed from a filament material chosen for increasing tensile strength of the 3-dimensional structure. The mesh formwork element may comprise force locked filament sections for increasing tensile strength of the 3-dimensional structure. The force locked filament sections may comprise weld joints.

The mesh formwork element may further comprise one or more re-enforcement structures for increasing tensile strength of the 3-dimensional structure.

The size of the apertures in the at least two opposing portions of the mesh formwork element may vary, for example as a function of applicable force and/or a desired 3-dimensional shape.

The mesh formwork element may comprise a base surface through which the material can substantially not penetrate, the base surface bounding the cavity.

The apertures in one or more of the at least two opposing portions of the mesh formwork element may be adapted to a dynamic pressure during the accumulating of the material.

A mesh formwork structure according to an example embodiment comprises a plurality of mesh formwork elements as described above.

A 3-dimensional structure according to an example embodiment comprises one or more formwork elements as described above.

Figure 30:
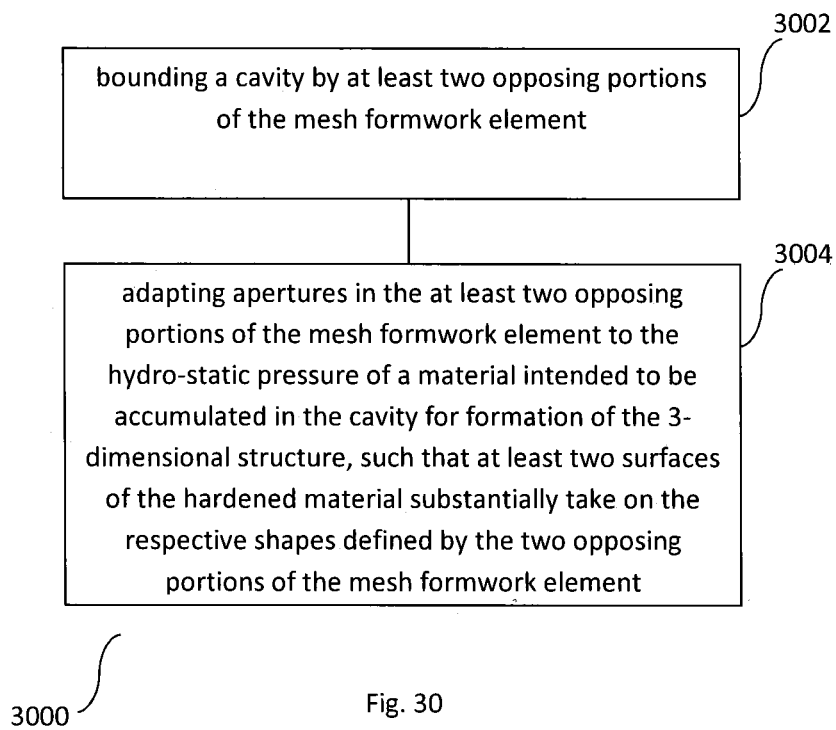
FIG. 30 illustrates a flowchart for fabricating a formwork element for fabricating a 3-dimensional structure, according to an example.

FIG. 30 shows a flowchart 3000 illustrating a method of fabricating a formwork element for fabricating a 3-dimensional structure, according to an example. At step 3002, a cavity is bound by at least two opposing portions of the mesh formwork element. At step 3004, apertures in the at least two opposing portions of the mesh formwork element are adapted to the hydro-static pressure of a material intended to be accumulated in the cavity for formation of the 3-dimensional structure, such that at least two surfaces of the hardened material substantially take on the respective shapes defined by the two opposing portions of the mesh formwork element.

The method may comprise providing an irregular arrangement of the apertures for a desired 3-dimensional shape of the mesh formwork element.

The method may further comprise providing a mesh structure between the at least two opposing portions and across the cavity. The method may further comprise connecting the mesh structure to the at least two opposing surfaces of the mesh formwork element for supporting the at least two opposing surfaces in their respective shapes. A size of apertures in the mesh structure may differ from a size of the apertures in the at least two opposing portions of the mesh formwork element near the connections to the mesh structure.

The method may further comprise providing one or more channel regions in the mesh structure to facilitate accumulating the material in the cavity. The channel regions may be defined by apertures of increased size compared to other regions of the mesh structure. The channel regions may be defined in gaps between adjacent mesh structures.

The method may comprise bounding the cavity by four surface portions of the mesh formwork element.

The mesh formwork element may be formed from a filament material chosen for increasing tensile strength of the 3-dimensional structure. The method may comprise force locking filament sections for increasing tensile strength of the 3-dimensional structure. The force locking of the filament sections may comprise welding joints.

The method may further comprise providing one or more re-enforcement bars for increasing tensile strength of the 3-dimensional structure.

The size of the apertures in the at least two opposing portions of the mesh formwork element may vary, for example as a function of applicable force and/or a desired 3-dimensional shape.

The method may comprise providing a base surface through which the material can substantially not penetrate, the base surface bounding the cavity.

The apertures in one or more of the at least two opposing portions of the mesh formwork element may be adapted to a dynamic pressure during the accumulating of the material.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features, in particular any combination of features in the patent claims, even if the feature or combination of features is not explicitly specified in the patent claims or the present embodiments.

For example, while cementitious mixtures have been described in the example embodiments, other materials such as foams or resins may be used in different embodiments.

The invention claimed is:

1. A method of fabricating a 3-dimensional structure, the method comprising:
   providing a mesh formwork element such that a cavity bound by at least two directly opposing portions of the mesh formwork is formed;
   accumulating a material in the cavity; and
   allowing the material to harden;
   wherein apertures in the at least two directly opposing portions of the mesh formwork element are adapted to the hydro-static pressure of the accumulated material or vice versa such that at least two surfaces of the hardened material substantially take on the respective shapes defined by the two directly opposing portions of the mesh formwork element, and
   the size of the apertures in the at least two directly opposing portions of the mesh formwork element varies as a function of applicable force.

2. The method as claimed in claim 1, wherein the material protrudes through the apertures before hardening.

3. The method as claimed in claim 2, wherein the material embeds the mesh formwork element such that the mesh formwork element re-enforces the 3-dimensional structure.

4. The method as claimed in claim 1, wherein the mesh formwork element comprises an irregular arrangement of the apertures providing a desired 3-dimensional shape of the mesh formwork element.

5. The method as claimed in claim 1, wherein providing the mesh formwork element further comprises forming a mesh structure between the at least two directly opposing portions and across the cavity.

6. The method as claimed in claim 5, wherein the mesh structure is connected to the at least two directly opposing portions of the mesh formwork element for supporting the at least two directly opposing portions in their respective shapes.

7. The method as claimed in claim 6, wherein a size of apertures in the mesh structure differ from a size of the apertures in the at least two directly opposing portions of the mesh formwork element near the connections to the mesh structure.

8. The method as claimed in claim 5 further comprising providing one or more channel regions in the mesh structure to facilitate accumulating the material in the cavity.

9. The method as claimed in claim 8, wherein the channel regions are defined by apertures of increased size compared to other regions of the mesh structure.

10. The method as claimed in claim 8, wherein the channel regions are defined in gaps between adjacent mesh structures.

11. The method as claimed in claim 1, wherein the mesh formwork element is provided such that the cavity is bound by four surface portions of the mesh formwork element.

12. The method as claimed in claim 1, wherein the mesh formwork element is formed from a filament material chosen for increasing tensile strength of the 3-dimensional structure.

13. The method as claimed in claim 12, wherein the mesh formwork element comprises force locked filament sections for increasing tensile strength of the 3-dimensional structure.

14. The method as claimed in claim 13, wherein the force locked filament sections comprise weld joints.

15. The method as claimed in claim 1, further comprising inserting one or more re-enforcement structures in the mesh formwork element for increasing tensile strength of the 3-dimensional structure.

16. A method of fabricating a 3-dimensional structure, the method comprising:
   providing a mesh formwork element such that a cavity bound by at least two directly opposing portions of the mesh formwork is formed;
   accumulating a material in the cavity; and
   allowing the material to harden;
   wherein apertures in the at least two directly opposing portions of the mesh formwork element are adapted to the hydro-static pressure of the accumulated material or vice versa such that at least two surfaces of the hardened material substantially take on the respective shapes defined by the two directly opposing portions of the mesh formwork element, and
   the size of the apertures in the at least two directly opposing portions of the mesh formwork element varies as a function of a desired 3-dimensional shape.

17. The method as claimed in claim 1, wherein the accumulating the material in the cavity comprises providing a base surface through which the material can substantially not penetrate, the base surface bounding the cavity.

18. The method as claimed in claim 17, wherein the base surface is provided by a foundation surface on which the structure is being fabricated.

19. The method as claimed in claim 1, wherein the accumulating of the material comprises filling the cavity with the material layer-by-layer.

20. The method as claimed in claim 19, wherein the material in one layer is not allowed to fully harden before a next layer is provided directly adjacent said one layer.

21. The method as claimed in claim 1, wherein the accumulating of the material comprises pouring or spraying the material into the cavity.

22. The method as claimed in claim 21, wherein the material comprises one or more of a group consisting of a cementitious mixture, a foam, and resin.

23. The method as claimed in claim 1, the method comprising providing a mesh formwork structure comprising a plurality of the mesh formwork elements and accumulating the material in the respective cavities of the mesh formwork elements and allowing the material to harden.

24. The method as claimed in claim 1, wherein the apertures in one or more of the at least two directly opposing portions of the mesh formwork element are adapted to a dynamic pressure during the accumulating of the material or vice versa.

* * * * *